(12) United States Patent
Kim et al.

(10) Patent No.: US 7,555,308 B2
(45) Date of Patent: Jun. 30, 2009

(54) DEVICE AND METHOD FOR PROCESSING CALL-RELATED EVENTS IN MOBILE TERMINAL

(75) Inventors: Jae-Ho Kim, Gumi-si (KR); Hyun-Ji Kim, Daegu (KR); Jeong-Wook Seo, Daegu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 404 days.

(21) Appl. No.: 11/311,379

(22) Filed: Dec. 20, 2005

(65) Prior Publication Data

US 2006/0135219 A1 Jun. 22, 2006

(30) Foreign Application Priority Data

Dec. 20, 2004 (KR) ...................... 10-2004-0108754
Nov. 30, 2005 (KR) ...................... 10-2005-0116018

(51) Int. Cl.
*H04M 1/00* (2006.01)

(52) U.S. Cl. .................. 455/550.1; 455/556.1; 455/418; 379/328

(58) Field of Classification Search ................. 455/418, 455/550.1, 414.1, 556.1; 370/328
See application file for complete search history.

(56) References Cited

U.S. PATENT DOCUMENTS

| 6,088,731 A | 7/2000 | Kiraly et al. | |
| 2005/0075097 A1* | 4/2005 | Lehikoinen et al. | 455/414.1 |
| 2005/0130631 A1* | 6/2005 | Maguire et al. | 455/414.1 |
| 2005/0207358 A1* | 9/2005 | Nishida et al. | 370/261 |

FOREIGN PATENT DOCUMENTS

| CN | 1309514 | 8/2001 |
| EP | 1 309 158 | 7/2003 |
| EP | 1 387 241 | 2/2004 |
| JP | 2004-064526 | 2/2004 |

OTHER PUBLICATIONS

"Method For Notifying Caller of Speed Dial Settings," *IBM Technical Disclosure Bulletin*, vol. 36, No. 09B, pp. 21-22, Sep. 1993, IBM Corp. 1993, XP000397053.

(Continued)

*Primary Examiner*—Danh C Le
(74) *Attorney, Agent, or Firm*—Roylance, Abrams, Berdo & Goodman, LLP

(57) ABSTRACT

Disclosed is a method and device for processing a call-related event in a mobile terminal. The device comprises a memory for storing character User Interface (UI) images corresponding to respective call-related events, an event collection part for collecting call-related events occurring in the mobile terminal and generating an event message for identifying each call-related event. The device also comprises an agent control part having a plurality of specialists for processing the call-related events, determining a specialist corresponding to an event message for a call-related event, selecting a character UI identification (ID) possessed by the determined specialist for the call-related event, outputting the selected character UI ID, and processing the call-related event according to feedback information received from a user. The device further comprises an agent expression part for outputting a character image and text corresponding to the character UI ID for the call-related event.

32 Claims, 18 Drawing Sheets

OTHER PUBLICATIONS

Luke Swartz, "Why People Hate the Paperclip: Labels, Appearance, Behavior and Social Responses To User Interface Agents," Jun. 12, 2003, XP002372788, *Symbolic Systems Program*, Stanford University.

W. Muller et al., "Face to Face With Your Assistant. Realization Issues of Animated User Interface Agents for Home Appliances," Pergamon Press Ltd, Computer and Graphics, vol. 25. No. 4., (Aug. 2001), pp. 593-600, XP004296036, *Department of Computer Science*, Technische Universitat Darmstadt, Germany.

* cited by examiner

DEVICE AND METHOD FOR PROCESSING CALL-RELATED EVENTS IN MOBILE TERMINAL

PRIORITY

This application claims the benefit under 35 U.S.C. § 119(a) of Korean Patent Application Nos. 2004-108754 and 2005-116018, filed Dec. 20, 2004, and Nov. 30, 2005, respectively, in the Korean Intellectual Property Office, the entire contents of which are hereby incorporated by reference.

BACKGROUND OF THE INVENTION

1. Field of the Invention

The present invention relates to an agent device and method for a mobile terminal. More particularly, the present invention relates to a method and device for processing call-related events in a mobile terminal using a character agent function.

2. Description of the Related Art

Generally, "mobile terminals" refer to mobile phones or handheld devices used for wireless communication. Mobile terminals have gone beyond merely being telephones and now integrate various additional functions. Recently, camcorder phones equipped with a camera, TV phones with a TV receiver, digital TV phones (DMB or DVB phones), and MP3 phones capable of processing MP3 music files have gained popularity with such additional functions. To meet the increasing demand for additional functions, mobile terminals have recently been introduced that are capable of processing multimedia data.

Mobile terminals generally include an LCD display unit to effectively display multimedia data and data showing operational states. Due to the development of mobile display technologies, various types of visual user data, including photographs, character images or animation, can be displayed on the LCD display unit of a mobile terminal during implementation of additional functions. It is a current trend to develop mobile terminals that can display character images in relation to the additional functions.

SUMMARY OF THE INVENTION

Accordingly, an object of the present invention is to provide a device for informing the user of a call-related event in a mobile terminal using a character agent function.

Another object of the present invention is to provide a method for analyzing a call-related event occurring in a mobile terminal, selecting a character User Interface (UI) possessed by an appropriate specialist for the event, and expressing the selected character UI.

Still another object of the present invention is to provide a device and method for processing a call-related event in a mobile terminal by selecting a corresponding character UI and expressing the selected character UI.

In accordance with one aspect of the present invention for accomplishing the above objects, there is provided a device for processing a call-related event in a mobile terminal. The device comprises a memory for storing character UI images corresponding to respective call-related events, an event collection part for collecting call-related events occurring in the mobile terminal and generating an event message for identifying each call-related event. The device also comprises an agent control part having a plurality of specialists for processing the call-related events, determining a specialist corresponding to an event message for a call-related event, selecting a character UI Identification (ID) possessed by the determined specialist for the call-related event, outputting the selected character UI ID, and processing the call-related event according to feedback information received from a user. The device further comprises an agent expression part for outputting a character image and text corresponding to the character UI ID for the call-related event.

In accordance with another aspect of the present invention, there is provided a method for processing a call-related event in a mobile terminal. The method comprises storing a call-related event that has occurred in the mobile terminal, confirming a specialist previously set to process the call-related event, and calling out the confirmed specialist to process the call-related event and displaying an expression showing the event processing results as previously set according to the specialist.

BRIEF DESCRIPTION OF THE DRAWINGS

The above and other objects, exemplary features and advantages of the present invention will be more apparent from the following detailed description of certain exemplary embodiments taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Although the kinds of events and the information necessary for agent expressions are specifically defined in the following description of the present invention, such definitions are provided to improve understanding of the present invention. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
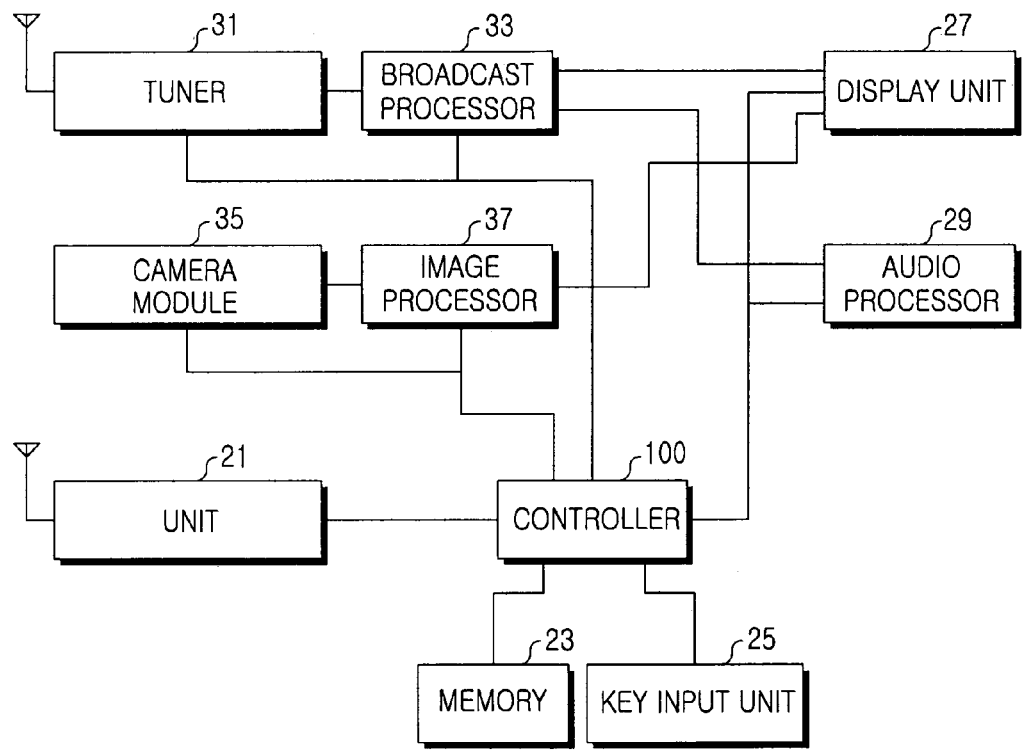
FIG. 1 is a block diagram of a mobile terminal according to a preferred exemplary embodiment of the present invention.

FIG. 1 is a block diagram of a mobile terminal according to a preferred exemplary embodiment of the present invention. Referring to FIG. 1, a radio frequency (RF) unit 21 performs a wireless communication function in the mobile terminal. The RF unit 21 comprises an RF transmitter for performing upward conversion and amplification of the frequency of a transmitted signal and an RF receiver for amplifying a received signal with low noise and performing a downward conversion of the frequency of the signal.

A key input unit 25 is provided with keys for inputting numbers and characters and function keys for setting up various functions. The key input unit 25 can also comprise keys for controlling character agents corresponding to the respective events in accordance with the present invention.

A memory 23 can comprise program memory and data memory. The program memory comprises programs for processing call signals and for controlling agent expressions to correspond to the generated events according to an exemplary embodiment of the present invention. The data memory temporarily stores data generated during implementation of the above programs. The memory 23 also comprises character memory for storing character images for agent expressions in accordance with an exemplary embodiment of the present invention. The character memory can run as a file system. Also, each character image can have an index of the memory (or file system). The character memory can store character images classified according to the gestures, facial expressions and items of a character. In other words, the character memory stores character information classified by image for agent expressions. The memory 23 also comprises text memory for storing text for agent expressions. The text memory can store text according to events or feedback.

A control unit 100 controls overall operations of the mobile terminal. The control unit 100 comprises a modem for modulating and demodulating a signal, and a codec for coding and decoding a signal so as to modulate and code a signal to be transmitted, and to demodulate and decode a received signal. The control unit 100 can be an MSM chip. According to a user's mode selection, the control unit 100 controls the implementation of a communication mode, camera mode, and broadcasting reception mode. It is possible to separate the modem and the codec from the control unit 100 to form an independent data processor. In such a case, the data processor can be placed between the control unit 100 and the RF unit 21. In accordance with an exemplary embodiment of the present invention, the control unit 100 collects events occurring in the mobile terminal and controls an agent to process each event and express the processing results with a character agent. For the agent expression, a corresponding character and text selected from the memory 23 are displayed. Also, the character and text are determined according to feedback information.

A camera module 35 is operated by the control unit 100 when the user selects the camera mode. The camera module 35 take pictures and generates image signals. An image processor 37 scales the image signal taken by the camera 35 up or down so that it conforms to the size of a display unit 27 and then outputs the image signal to be displayed on the display unit 27. In a save mode, the image processor 37 encodes the image signal in a preset manner and stores the encoded image signal in memory 23. In a reproduction mode, the image processor 37 decodes received or stored image data.

A tuner 31 receives a broadcasting signal of a set channel in the broadcasting reception mode under control of the control unit 100. A broadcast processor 33 demodulates and decodes the broadcasting signal received by turner 31 into a video signal and an audio signal. The broadcast processor 33 outputs the video signal to the display unit 27 and the audio signal to an audio processor 29. The broadcasting signal can be a satellite broadcasting signal or a terrestrial broadcasting signal.

The display unit 27 displays menus for selecting specific functions or operations under the control of control unit 100. When an event occurs in the mobile terminal, the display unit 27 displays a character image corresponding to the event. In the camera mode or the broadcasting reception mode, display unit 27 displays an image signal outputted from the image processor 37 or the broadcast processor 33.

The audio processor 29 processes an audio signal generated during the communication mode under the control of control unit 100. Also, the audio processor 29 processes an audio signal generated during the camera mode and an broadcasting audio signal received under the control of the broadcast processor 33 during broadcasting reception mode.

The mobile terminal having the above structure may exclude the camera module or the broadcast processor, which are not absolutely necessary to implement a character agent function according to the present invention. In the following description, a "character" refers to a general image and can include images such as an avatar image, a wallpaper image, and a word balloon. In other words, a "character" can be any image which is an avatar or a non-avatar.

Figure 2:
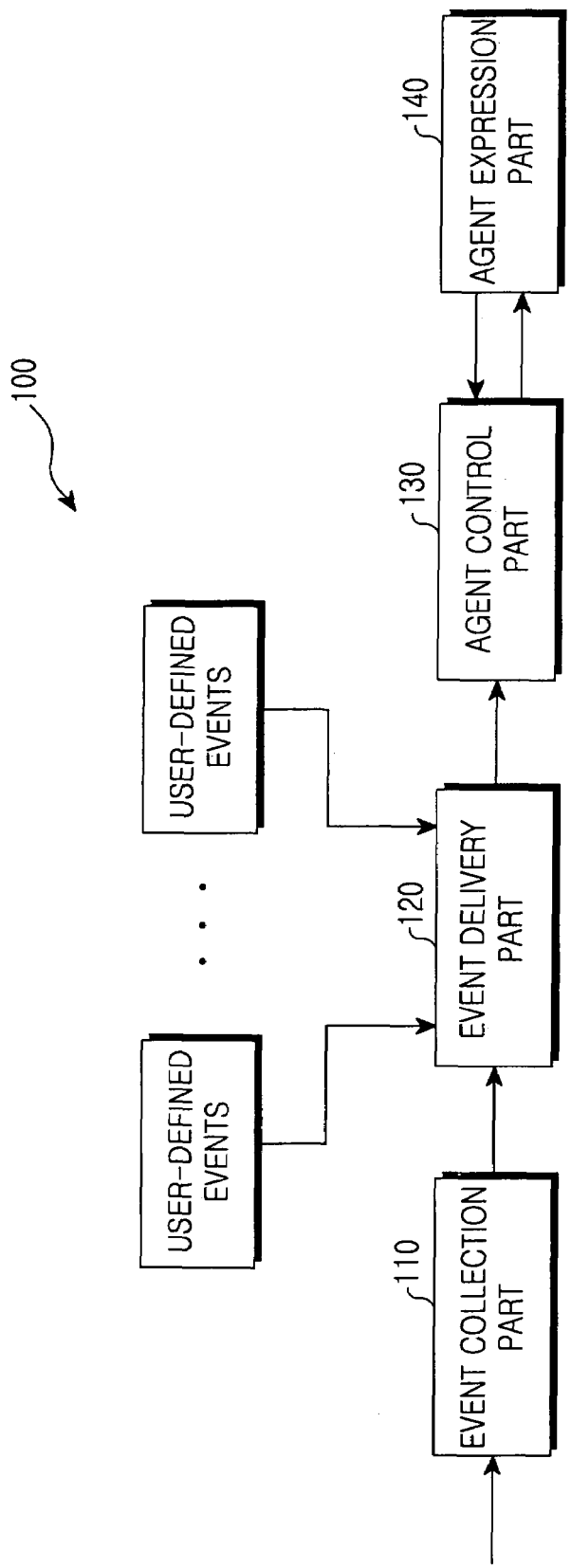
FIG. 2 is a block diagram of a control unit of a mobile terminal according to a preferred exemplary embodiment of the present invention.

FIG. 2 is a block diagram of the control unit 100 of the mobile terminal according to a preferred exemplary embodiment of the present invention. The structure of control unit 100 in FIG. 2 is disclosed in Korean Patent Application No. 2004-78470 ("Intelligent Terminal Using Artificial Intelligence Agent," Inventors: Jae-Ho KIM et al.), filed previously by the present applicant, the entire contents of which are hereby incorporated by reference. Accordingly, the structure of the control unit will be explained based on the disclosure in the 2004-78470 application. Referring to FIG. 2, the control unit 100 comprises an event collection part 110, an event delivery part 120, an agent control part 130, and an agent expression part 140. These four functional parts may be incorporated into a single agent system which is controlled by the control unit 100.

Referring to FIG. 2, the event collection part 110 collects events occurring in the mobile terminal. The events comprise all possible events that can occur in the mobile terminal in relation to communications, operational states of the terminal, user demands, or multimedia functions. In other words, the event collection part 110 collects events that are defined in the mobile terminal. When an event occurs, the event collection part 110 generates an event message for identifying the event and transfers the generated event message to the event delivery part 120.

The event delivery part 120 delivers the event message received from the event collection part 110 to a corresponding client. In the following exemplary description, it will be explained that the event delivery part 120 delivers the event message to the agent control part 130. However, if there is any other part requesting the event message, the event delivery part 120 will also deliver the event message to the other part. The event delivery part 120 can receive user-defined events that are not defined in the mobile terminal, as well as the events collected by the event collection part 110. The event delivery part 120 also delivers user-defined events to the agent control part 130. The user-defined events are called application events which may occur during implementation of activities such as, for example, a mobile game, an application program, or a web service program.

When an event message is received from the event delivery part 120, the agent control part 130 stores the received event message in an inner buffer thereof. Also, the agent control part 130 analyzes the event message and determines a UI to express a corresponding character agent. The event message delivered from the event delivery part 120 can be a message identifying an event that has occurred in the mobile terminal (that is, an event collected by the event collection part 110) or an application event. The following exemplary description of the invention will focus on agent expressions for the events collected by the event collection part 110. The agent control part 130 controls a plurality of specialists provided therein and selects a specialist corresponding to each event occurring in the mobile terminal. When an event is received, the agent control part 130 notifies an appropriate specialist of the occurrence of the event and requests the agent expression part 140 to provide a corresponding UI so that the selected specialist can finally display an agent expression. Also, the agent control part 130 processes feedback information inputted by the user regarding the event.

The agent expression part 140 displays a character expression corresponding to the event according to the agent UI information outputted from the agent control part 130. The agent expression part 140 manages a plurality of avatar UIs that can be displayed on the display unit 27, and controls display of an avatar corresponding to a specific event according to the UI information requested by the agent control part 130. When the user generates feedback information during display of an avatar corresponding to an event, the agent expression part 140 sends the received feedback information to the agent control part 130. The agent control part 130 then controls the agent according to the user feedback information received from the agent expression part 140.

In the structure of FIG. 2, the event delivery part 120 may be unnecessary when processing only the events collected by the event collection part 110. The inner buffer of the agent control part 130 will hereinafter be called a blackboard.

The structure and operation of the agent control part 130 will be explained in more detail. The agent control part 130 comprises a plurality of specialist which are called out according to events to process the events and output the processing results The agent control part 130 also comprises a blackboard for storing various information including information on event messages. The agent control part 130 also comprises a supervisor for selecting one of the plurality of specialists outputting effective results, an avatar value storage part for storing values of avatar images according to the events occurring in the mobile terminal, and a specialist manager for selecting a specialist from a list of specialists for respective events when a specific event occurs and for controlling an agent expression according to the event.

The specialists contribute to solve problems. With expertise in specific fields, the specialists record intermediate-level solutions in the blackboard and express a priority and a user preference to the intermediate-level solutions. Each specialist grasps the condition of the blackboard, requests calculation of the priority and user preference, and records the intermediate-level solutions in the blackboard.

The blackboard is a working environment and information space in which the specialists communicate with one another. Basically, the blackboard allows the specialists to record the intermediate-level solutions therein. The blackboard pattern has some advantages. First, the blackboard can easily incorporate different kinds of specialists. Second, the blackboard can be independently modularized because the specialists have relatively little influence on each other. Third, the blackboard is flexible to various changes (such as changes in algorithm of the specialists and addition of a new specialist).

When two or more specialists are selected for one event, the specialist manager requests the supervisor to select the specialist most relevant to the received event. Then the supervisor analyzes the data in the blackboard and the priority and user preference to the event in order to select the most relevant specialist.

The avatar value varies depending on the events occurring in the mobile terminal, agent function, and user feedback. In addition, the avatar value changes according to various application events. An avatar interface changes with the change in the avatar value. Also, an avatar grows as time goes by, which represents an avatar growth concept. The mobile terminal according to the present invention can grow an avatar on the basis of an artificial intelligence agent system. In this connection, the mobile terminal recommends the user to do specific actions regarding various events so that the user can have effective use of the terminal and have fun. The avatar value also changes according to user feedback.

Table 1 shows specific examples of agent expressions displayed regarding various events according to a preferred exemplary embodiment of the present invention. Table 1 lists event use cases, event classification, event determination point, event processing point, event parameters (necessary information), frequency/times, condition, UI text and user selection. Any event can be added to, or deleted from, the following use cases.

TABLE 1

| ID | Use Case | Class | UI Text | Selection |
|---|---|---|---|---|
| 2 | When frequently dialed telephone number is not included in a phonebook, recommend registering the number in the phonebook. | Call | [Phone number] isn't in your contact list. Will you register it? | Yes/No |
| 3 | When there is a call from a frequently rejected telephone number, recommend registering the number in a reject list. | Call | You've rejected the incoming call from [name/phone number]. Do you want to register it in the reject list? | Yes/No |
| 9 | Praise when a call lasted a long time. | Call | I think you had a pleasant talk with [name]. You made a long call. | Yes/Really/Cut it off |
| 11 | Recommend calling a person to whom outgoing calls are to be made at a specific time or on a specific day of week. | Call | It's Friday. Don't you have to call [name] today? | Yes/No |
| 13 | Recommend calling a person if the number of incoming calls from the person is much greater than the number of outgoing calls to the person. | Call | You've received a lot of calls from [name]. Will you call [name] today? | Yes/No |

Hereinafter, a process for processing call-related events in the mobile terminal according to an exemplary embodiment of the present invention will be explained in detail.

Figure 3:
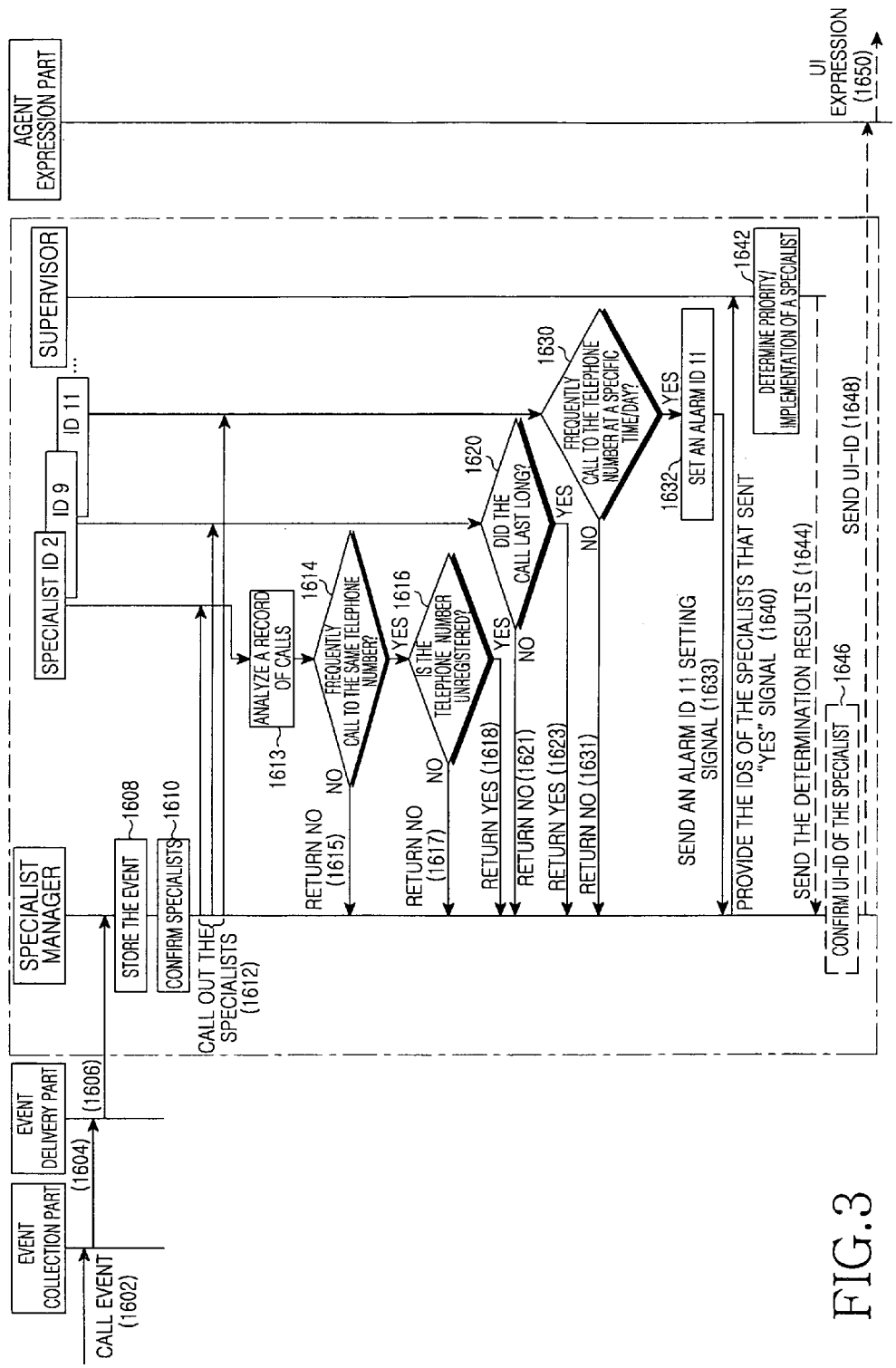
FIG. 3 is a flow chart showing a process for processing a call event in a mobile terminal using a character agent according to a preferred exemplary embodiment of the present invention.

FIG. 3 is a flow chart showing a process for processing a call event in a mobile terminal using a character agent according to a preferred exemplary embodiment of the present invention. Referring to FIG. 3, when a call-related event occurs, the event collection part collects the event at step 1602. The call-related event can be a call termination, an incoming call, an outgoing call or any other call-related event. The call-related event collected by the event collection part is transferred to the event delivery part at step 1604. The event delivery part then delivers the event to the specialist manager of the agent control part at step 1606. The specialist manager stores the call-related event in the blackboard at step 1608. The specialist manager checks the specialist list at step 1610 to confirm specialists that can be called out when the event occurs. Then the specialist manager calls out the specialists at step 1612 (FIG. 3 shows an example wherein specialists having ID 2, 9 and 11 are called out).

Among the called-out specialists, specialist ID 2 is used to recommend that the user register a telephone number that has been frequently dialed but is not already registered. Specialist ID 2 analyzes a record of calls at step 1613 and determines whether the user has made outgoing calls to the telephone number frequently (over a critical number of calls) recently (during a certain period) at step 1614. Upon determining that the user has not frequently made outgoing calls to the telephone number, specialist ID 2 sends a "no" signal to the specialist manager at step 1615. If it is determined that the user has frequently made outgoing calls to the telephone number, specialist ID 2 will proceed to step 1616 in order to confirm whether the telephone number is unregistered. If the telephone number is not unregistered, specialist ID 2 will send a "no" signal to the specialist manager at step 1617. If the telephone number is unregistered, specialist ID 2 will then send a "yes" signal to the specialist manager at step 1618.

Specialist ID 9 is used to praise the user when a call has lasted a long time. Upon termination of the call, specialist ID 9 determines whether the call lasted over a preset critical period of time (for example, 20 minutes) at step 1620. If the duration of the call is not longer than the critical period of time, specialist ID 9 will proceed to step 1621 in order to send a "no" signal to the specialist manager. If the duration of the call is longer than the critical period, specialist ID 9 will then proceed to step 1623 in order to send a "yes" signal to the specialist manager.

Specialist ID 11 is used to recommend that the user make an outgoing call to a telephone number that has been dialed frequently (over a predetermined number of times within a defined time period) at a specific time of day or on a specific day of week. When the specific time of day or specific day of week is reached, such recommendation can be made at a preset time, which can be a time period from a first point of time to the termination of the last call (for example, 30 minutes before the termination of the last call to the telephone number), a time period from the termination of the last call to a second point of time (for example, 30 minutes after the last call termination), or a time period from the first point of time to the second point of time.

At step 1630, specialist ID 11 determines whether the user frequently makes outgoing calls to the currently dialed telephone number at a specific time or on a specific day of the week. If not, specialist ID 11 will proceed to step 1631 in order to send a "no" signal to the specialist manager. If the user frequently makes calls at a specific time or on a specific day of the week, specialist ID 11 will then proceed to step 1632 in order to set an alarm (for example, alarm ID 11) to be generated at a preset time and send an "ID 11 alarm setting" signal to the specialist manager. For example, if the user made a first call to a particular telephone number at 10:10 a.m. on Monday in the first week of a month, a second call to the same number at 10:10 a.m. on Monday in the second week, and a third call to the same number at 10:15 a.m. on Monday in the third week, specialist ID 11 will recognize that the user dials the telephone number regularly (every seven days) on Mondays. Thus, specialist ID 11 will set the "ID 11 alarm" and at step 1633 send the "ID 11 alarm" signal to the specialist manager.

When receiving all return signals from the called-out specialists, the specialist manager provides the IDs of the specialists that have sent a "yes" signal (for example, ID 2 and ID 9 in FIG. 3) to the supervisor at step 1640. The supervisor proceeds to step 1642 to determine the specialists having the highest priority. When only one specialist has sent a "yes" signal, the supervisor determines whether the specialist should be implemented at step 1642. The supervisor then transfers the determination results to the specialist manager at step 1644. Based on the determination results, the specialist manger confirms a UI-ID preset to the highest priority specialist or the specialist to be implemented at step 1646, and sends the UI-ID to the agent expression part at step 1648. Accordingly, the agent expression part can express a corresponding UI at step 1650.

Figure 14A:
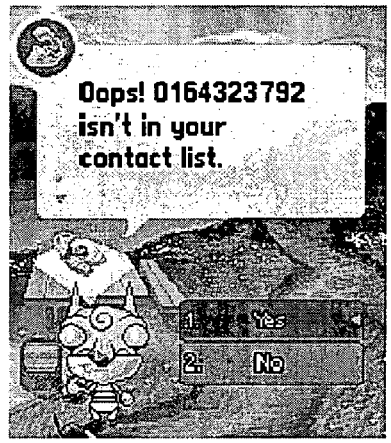
FIG. 14 illustrates character images and text for recommending registration of a telephone number according to a preferred exemplary embodiment of the present invention.
Figure 14B:
Figure 14C:
Figure 14D:

For example, a UI corresponding to specialist ID 2 can be expressed as illustrated in FIG. 14(A) to comprise a message recommending that the user register the currently dialed telephone number. According to the user feedback, the mobile terminal may display a happy character image and text as illustrated in FIG. 14(B) to allow the user to select a contact type. When the user selects a contact type, the control unit 100 then displays a happy character image and text confirming the registration as illustrated in FIG. 14(C). Alternatively, the mobile terminal may display a sad character image and text as illustrated in FIG. 14(D) to inform that the telephone number will not be registered. The displayed character image and text will disappear after a predetermined time period or upon input of a predetermined key.

Figure 15A:
FIG. 15 illustrates character images and text for informing the user of a call duration according to a preferred exemplary embodiment of the present invention.
Figure 15B:
Figure 15C:
Figure 15D:

A UI corresponding to specialist ID 9 can be expressed as illustrated in FIG. 15(A) to comprise a message praising the user when a call has lasted a long time. According to the user feedback, the mobile terminal may display either a happy character image and corresponding text as illustrated in FIG. 15(B) or 15(C), or an angry character image and corresponding text as illustrated in FIG. 15(D). The displayed character image and text will disappear after a predetermined time period or upon input of a predetermined key.

Figure 4:
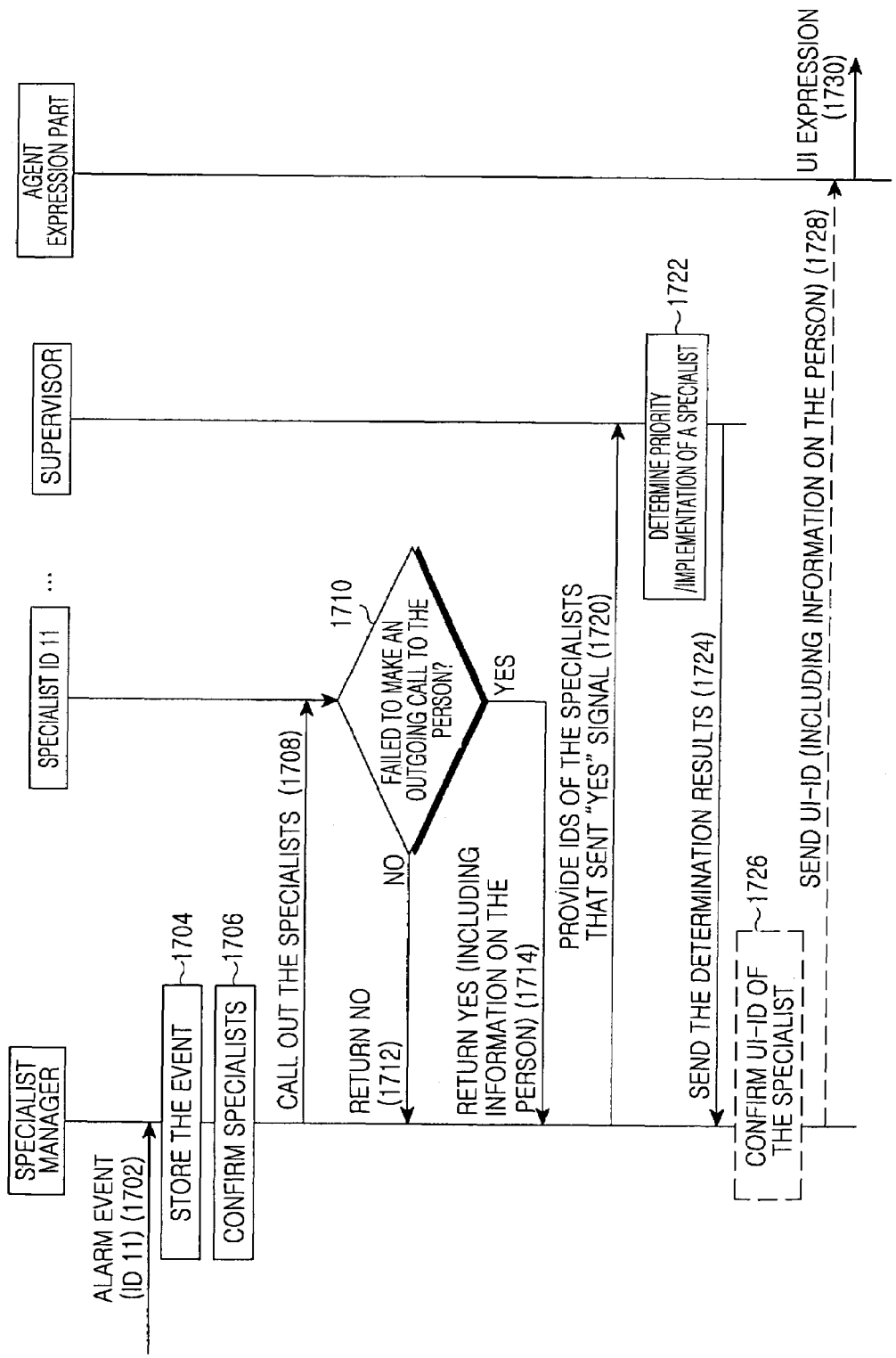
FIG. 4 is a flow chart showing a process for processing a call recommendation alarm event which has been set by a character according to a preferred exemplary embodiment of the present invention.

FIG. 4 is a flow chart showing a process for processing a call recommendation alarm event which has been set by a character agent (that is, specialist ID 11) according to a preferred exemplary embodiment of the present invention. As explained in conjunction with FIG. 3, an event occurring in the mobile terminal is sent to the agent control part through the event collection part and the event delivery part. Referring to FIG. 4, when an alarm event (for example, an ID 11 alarm) is delivered at step 1702, the specialist manager stores the received alarm event in the blackboard at step 1704. The specialist manager checks the specialist list at step 1706 to confirm one or more specialists that can be called out when the ID 11 alarm event occurs. Then the specialist manager calls out the confirmed specialist at step 1708 (FIG. 4 shows an example wherein specialist ID 11 is called out).

At step 1710, the called-out specialist (specialist ID 11) determines whether the user failed to make an outgoing call to a frequently and periodically dialed telephone number during a preset time. The preset time can be a time period from a first point of time to the termination of the call (for example, 30 minutes before the termination of the last call to the telephone number), a time period from the termination of the call to a second point of time (for example, 30 minutes after the call termination), or a time period from the first point of time to the second point of time. For example, if the user made a first call to a particular telephone number at 10:10 a.m. on Monday in the first week of a month, a second call to the same number at 10:10 a.m. on Monday in the second week, and a third call to the same number at 10:15 a.m. on Monday in the third week, specialist ID 11 will confirm whether the user has made an outgoing call to the same number during a time period between 9:45 a.m. (30 minutes before termination of the last call in the third week) and 10:15 a.m. on Monday in the fourth week (seven days after the last call).

If the user has not failed to make a call to the same telephone number, specialist ID 11 will proceed to step 1712 in order to send a "no" signal to the specialist manager. If the user failed, specialist ID 11 will proceed to step 1714 in order to send a "yes" signal to the specialist manager. With the "yes" signal, specialist ID 11 can also send information on the owner of the telephone number.

When receiving a return signal from the called-out specialist, the specialist manager provides the ID (ID 11) of the specialist that sent a "yes" signal to the supervisor at step 1720. The supervisor proceeds to step 1722 to determine the specialists having the highest priority. When only one specialist has sent a "yes" signal, the supervisor determines whether the specialist should be implemented at step 1722. The supervisor then transfers the determination results to the specialist manager at step 1724. Based on the determination results, the specialist manger confirms a UI-ID preset to the highest priority specialist or the specialist to be implemented at step 1726, and sends the UI-ID to the agent expression part at step 1728 so that the agent expression part can express a corresponding UI. Accordingly, the agent expression part can express a corresponding UI at step 1730.

Figure 16A:
FIG. 16 illustrates character images and text for recommending an outgoing call according to a preferred exemplary embodiment of the present invention.
Figure 16B:
Figure 16C:
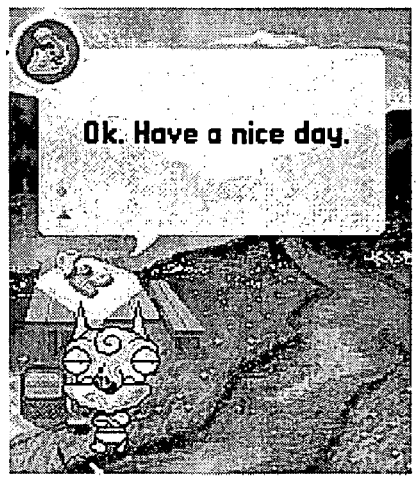

At this time, information on the owner of the telephone number is also sent to the agent expression part. Thus, the corresponding UI can be expressed as illustrated in FIG. 16(A) to comprise a message recommending that the user make an outgoing call to a telephone number. According to the user feedback, the mobile terminal may display a happy character image and text as illustrated in FIG. 16(B) to inform a call connection to the telephone number. Alternatively, the mobile terminal may display a sad character image and text as illustrated in FIG. 16(C) to inform that a call to the telephone number will not be made now. The displayed character image and text will disappear after a predetermined time period or upon input of a predetermined key.

Figure 5:
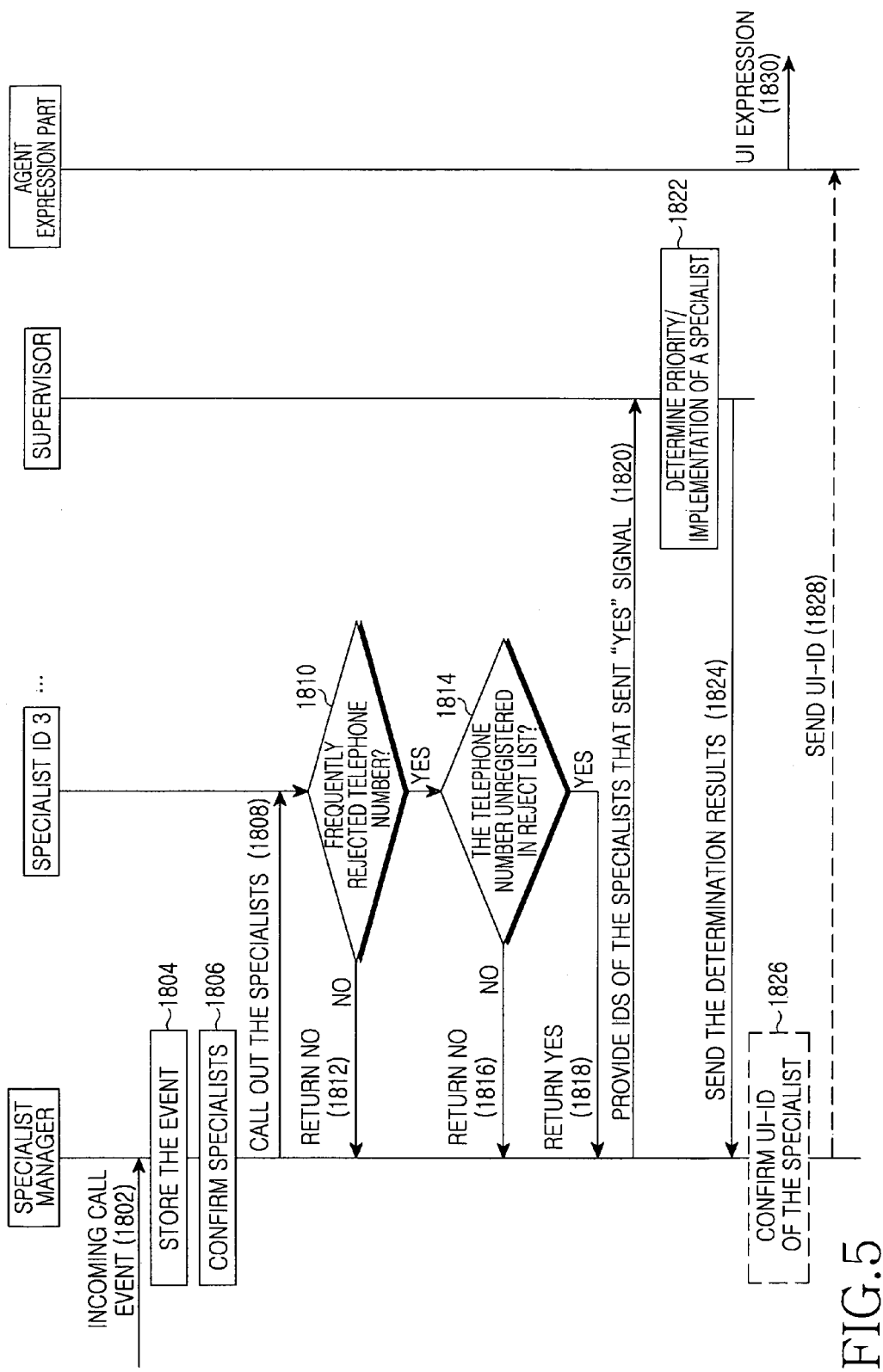
FIG. 5 is a flow chart showing a process for processing an incoming call event in a mobile terminal using a character agent according to a preferred exemplary embodiment of the present invention.

FIG. 5 is a flow chart showing a process for processing an incoming call event in a mobile terminal using a character agent according to a preferred exemplary embodiment of the present invention. Referring to FIG. 5, when an incoming call event is delivered at step 1802, the specialist manager stores the received incoming call event in the blackboard at step 1804. The specialist manager checks the specialist list at step 1806 to confirm one or more specialists that can be called out when the incoming call event occurs. The specialist manager then calls out the confirmed specialists at step 1808 (FIG. 5 shows an example wherein specialist ID 3 is called out).

Specialist ID 3 is used to recommend the user to register a telephone number in a reject list if incoming calls from the telephone number have been frequently rejected. At step 1810, the called-out specialist (specialist ID 3) determines whether the incoming call is originated from a frequently rejected telephone number. To be specific, the specialist determines whether incoming calls from a specific telephone number have been rejected in excess of a predetermined number of times for a predetermined period of time (for example, more than three times for the last two weeks). If the incoming call has not originated from a frequently rejected telephone number, the specialist will proceed to step 1812 in order to send a "no" signal to the specialist manager. If the incoming call originates from a frequently rejected telephone number, the specialist will then proceed to step 1814 to determine whether the telephone number is registered in the reject list. If the telephone number is registered, the specialist will send a "no" signal to the specialist manager at step 1816. If the telephone number is not registered in the reject list, the specialist will then send a "yes" signal to the specialist manager at step 1818.

When receiving a return signal from the called-out specialist, the specialist manager provides the ID (ID 3 in FIG. 5) of the specialist that sent a "yes" signal to the supervisor at step 1820. The supervisor proceeds to step 1822 to determine the specialists having the highest priority. When only one specialist has sent a "yes" signal, the supervisor determines whether the specialist should be implemented at step 1822. The supervisor then transfers the determination results to the specialist manager at step 1824. Based on the determination results, the specialist manger confirms a UI-ID preset to the highest priority specialist or the specialist to be implemented at step 1826, and sends the UI-ID to the agent expression part at step 1828 so that the agent expression part can express a corresponding UI. Accordingly, the agent expression part can express a corresponding UI at step 1830.

Figure 17A:
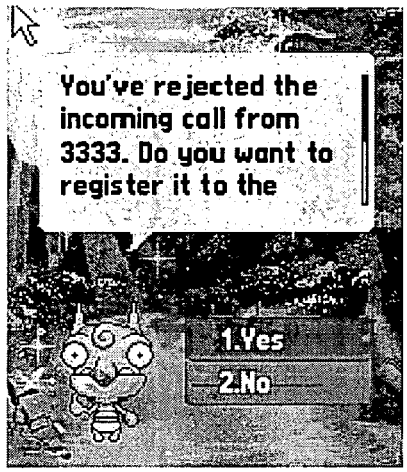
FIG. 17 illustrates character images and text for recommending rejection of an incoming call according to a preferred exemplary embodiment of the present invention.
Figure 17B:
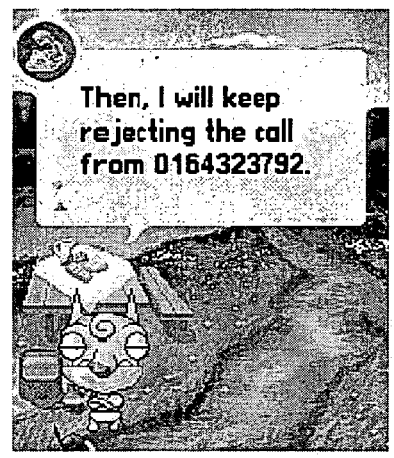
Figure 17C:
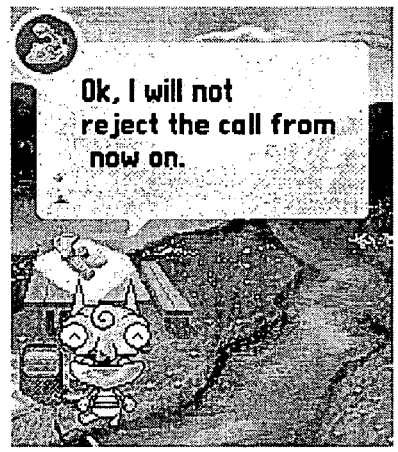
Figure 17D:

At this time, the corresponding UI can be expressed as illustrated in FIG. 17(A) to comprise a message recommending that the user register the pertinent telephone number in the reject list. According to the user feedback, the mobile terminal can display a sad character image and text as illustrated in FIG. 17(B) to inform the registration of the telephone number in the reject list. Alternatively, the mobile terminal can display a happy character image and text as illustrated in FIG. 17(C) to inform that the telephone number is not registered in the reject list. Automatic rejection of telephone numbers registered in the reject list is illustrated in FIG. 17(D). The displayed character image and text will disappear after a predetermined time period or upon input of a predetermined key.

Figure 6:
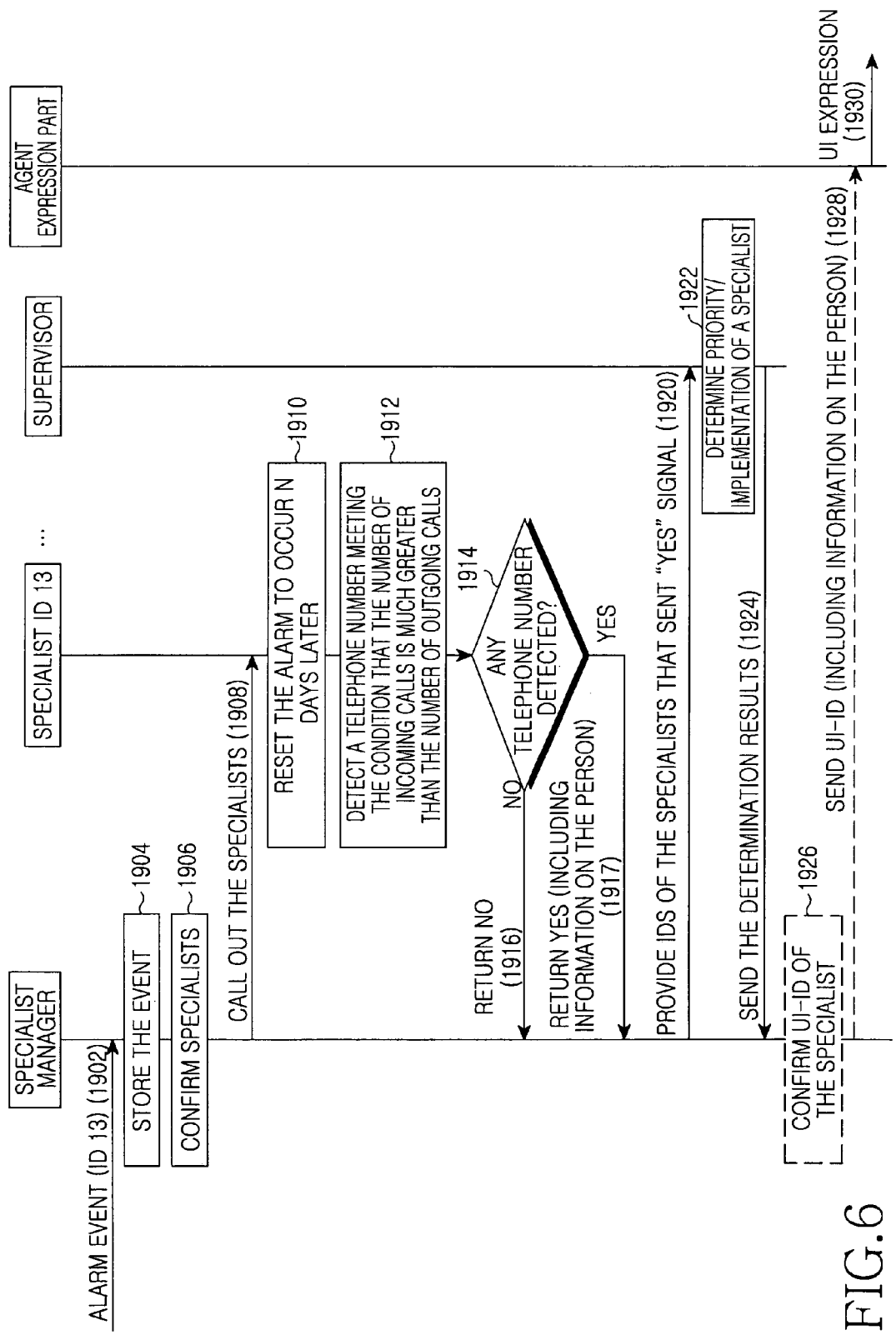
FIG. 6 is a flow chart showing a process for processing an alarm event in a mobile terminal using a character agent according to a preferred exemplary embodiment of the present invention.

FIG. 6 is a flow chart showing a process for processing an alarm event in a mobile terminal using a character agent according to a preferred exemplary embodiment of the present invention. Referring to FIG. 6, when an alarm event (for example, alarm ID 13) is delivered at step 1902, the specialist manager stores the received alarm event in the blackboard at step 1904. The specialist manager checks the specialist list at step 1906 to confirm one or more specialists that can be called out when the ID 13 alarm event occurs. The specialist manager then calls out the confirmed specialists at step 1908 (FIG. 6 shows an example wherein specialist ID 13 is called out).

Specialist ID 13 is used to check whether a preset period ends and the next period begins, and alarm to recommend that the user make an outgoing call to a telephone number if the quantity of incoming calls received from the telephone number is much greater than the quantity of outgoing calls to the same telephone number during the preset period of time. At step 1910, the alarm (alarm ID 13) is reset to occur N days later. In other words, the alarm is set to periodically occur every N days. At step 1912, specialist ID 13 analyzes the quantity of incoming calls from each telephone number and the quantity of outgoing calls to each telephone number in order to determine whether the quantity of incoming calls received from a specific telephone number is much greater than the quantity of outgoing calls to the same number (that is, whether the difference between the quantity of incoming calls from a telephone number and the quantity of outgoing calls to the same telephone number is greater than a preset critical value). At step 1914, specialist ID 13 detects any telephone number that meets the above condition. If no such telephone number is detected, specialist ID 13 will send a "no" signal to the specialist manager at step 1916. If a telephone number meeting the above condition is detected, specialist ID 13 will then send a "yes" signal to the specialist manager at step 1917.

When receiving a return signal from the called-out specialist (specialist ID 13), the specialist manager provides the ID (ID 13) of the specialist that sent a "yes" signal to the supervisor at step 1920. The supervisor proceeds to step 1922 to determine the specialist having the highest priority. When only one specialist has sent a "yes" signal, the supervisor determines whether the specialist should be implemented at step 1922. The supervisor then transfers the determination results to the specialist manager at step 1924. Based on the determination results, the specialist manger confirms a UI-ID preset to the highest priority specialist or the specialist to be implemented at step 1926, and sends the UI-ID to the agent expression part at step 1928 so that the agent expression part can express a corresponding UI. Accordingly, the agent expression part can express a corresponding UI at step 1930.

Figure 18A:
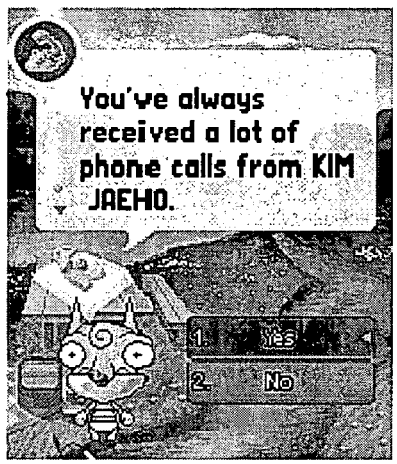
FIG. 18 illustrates character images and text for recommending an outgoing call according to a preferred exemplary embodiment of the present invention.
Figure 18B:
Figure 18C:

At this time, information on the owner of the detected telephone number is also sent to the agent expression part. Thus, the corresponding UI can be expressed as illustrated in FIG. 18(A) to comprise a message recommending that the user make an outgoing call to the detected telephone number. According to the user feedback, the mobile terminal may display a happy character image and text as illustrated in FIG. 18(B) to inform a call connection to the telephone number. Alternatively, the mobile terminal may display a sad character image and text as illustrated in FIG. 18(C) to inform that a call to the telephone number will not be made. The displayed character image and text will disappear after a predetermined time period or upon input of a predetermined key.

As explained above, call-related events occurring in the mobile terminal can be processed by each specialist of the character agent. Hereinafter, overall operations of the mobile terminal for processing a call-related event will be explained in detail with reference to the accompanying drawings. In the following exemplary description, it is assumed that the control unit 100 controls the function of parts incorporated into a single agent system.

Figure 7:
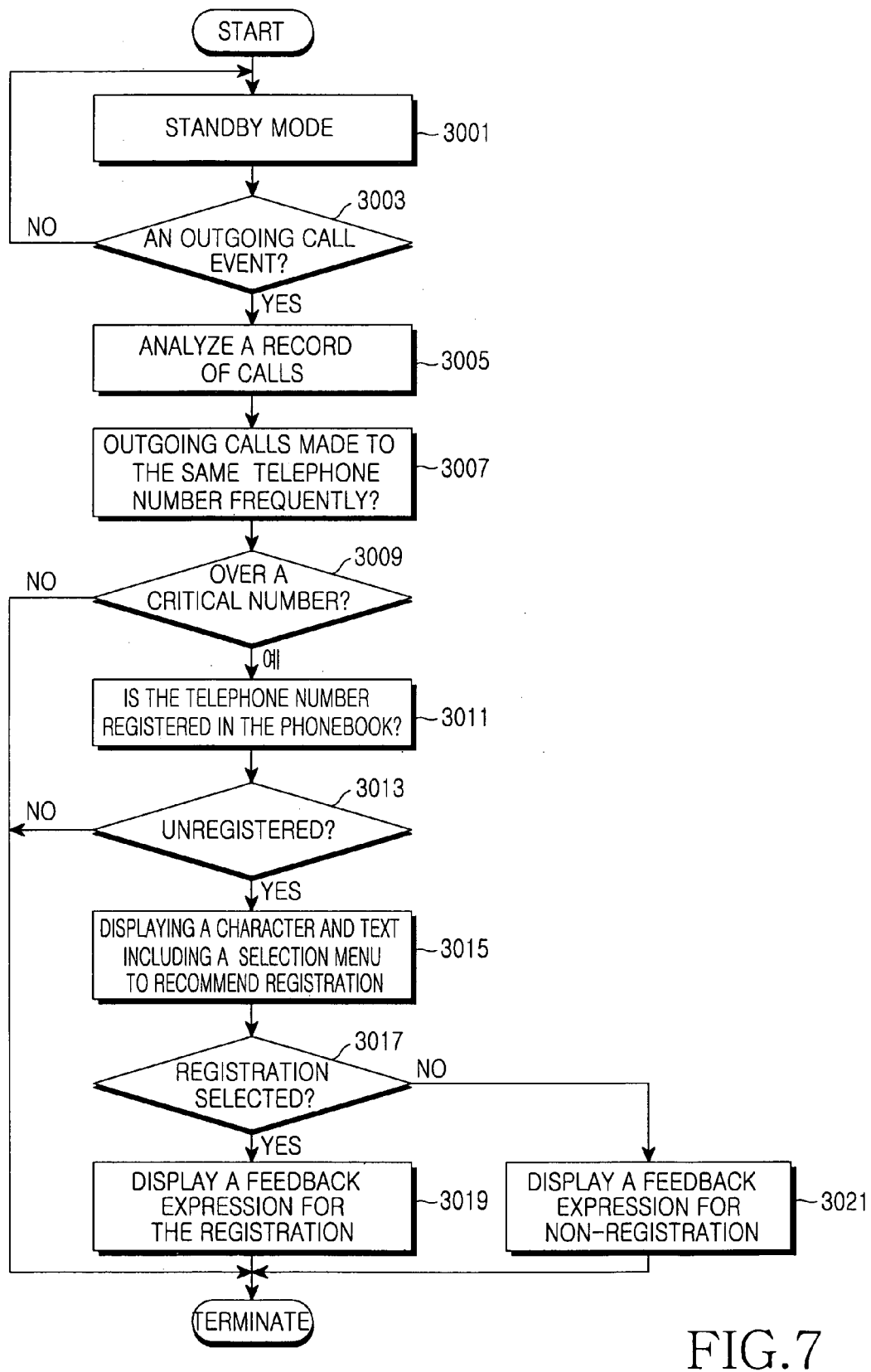
FIG. 7 is a flow chart showing a process for recommending registration of a telephone number in a mobile terminal according to a preferred exemplary embodiment of the present invention.

FIG. 7 is a flow chart showing a process for recommending registration of a telephone number in a mobile terminal according to a preferred exemplary embodiment of the present invention. Specifically, FIG. 7 shows a process for recommending registration of a frequently dialed telephone number. When an outgoing call event occurs in the standby mode at step 3001, the control unit 100 confirms the event at step 3003 and proceeds to step 3005. The control unit 100 analyzes a record of calls at step 3005 and confirms whether the user has made outgoing calls to the same person (telephone number) frequently (in excess of a critical number) recently (for a certain period) at step 3007. For example, the control unit 100 may confirm whether the user has made outgoing calls to the same person over four times within two weeks or fourteen days.

Step 3009 determines whether the user has made outgoing calls in excess of the critical number. If the user has not made outgoing calls to the person in excess of the critical number, the control unit 100 will terminate the process. If the user has made outgoing calls in excess of the critical number, the control unit 100 will proceed to step 3011 in order to confirm whether the pertinent telephone number is registered in the phonebook. When the control unit 100 detects that the telephone number is not registered at step 3013, it proceeds to step 3015. At step 3015, the control unit 100 displays an avatar image and text including a selection menu as illustrated in FIG. 14(A) to recommend the user to register the telephone number in the phonebook.

When the user selects "1. Yes" in the selection menu, the control unit 100 detects the selection at step 3017 and proceeds to step 3019 in order to display a feedback expression for the registration of the telephone number. Specifically, the feedback expression can be a happy character image and text for allowing the user to select a contact type as illustrated in FIG. 14(B). When the user selects a contact type, the control unit 100 then displays a happy character image and text confirming the registration as illustrated in FIG. 14(C).

When the user selects "2. No" in the selection menu, the control unit 100 detects the selection at step 3017 and proceeds to step 3021 in order to display a feedback expression for not registering the telephone number. The feedback expression can be a sad character image and text informing that the telephone number is not to be registered as illustrated in FIG 14(D). The displayed character image and text will disappear after a predetermined time period or upon input of a predetermined key.

Figure 8:
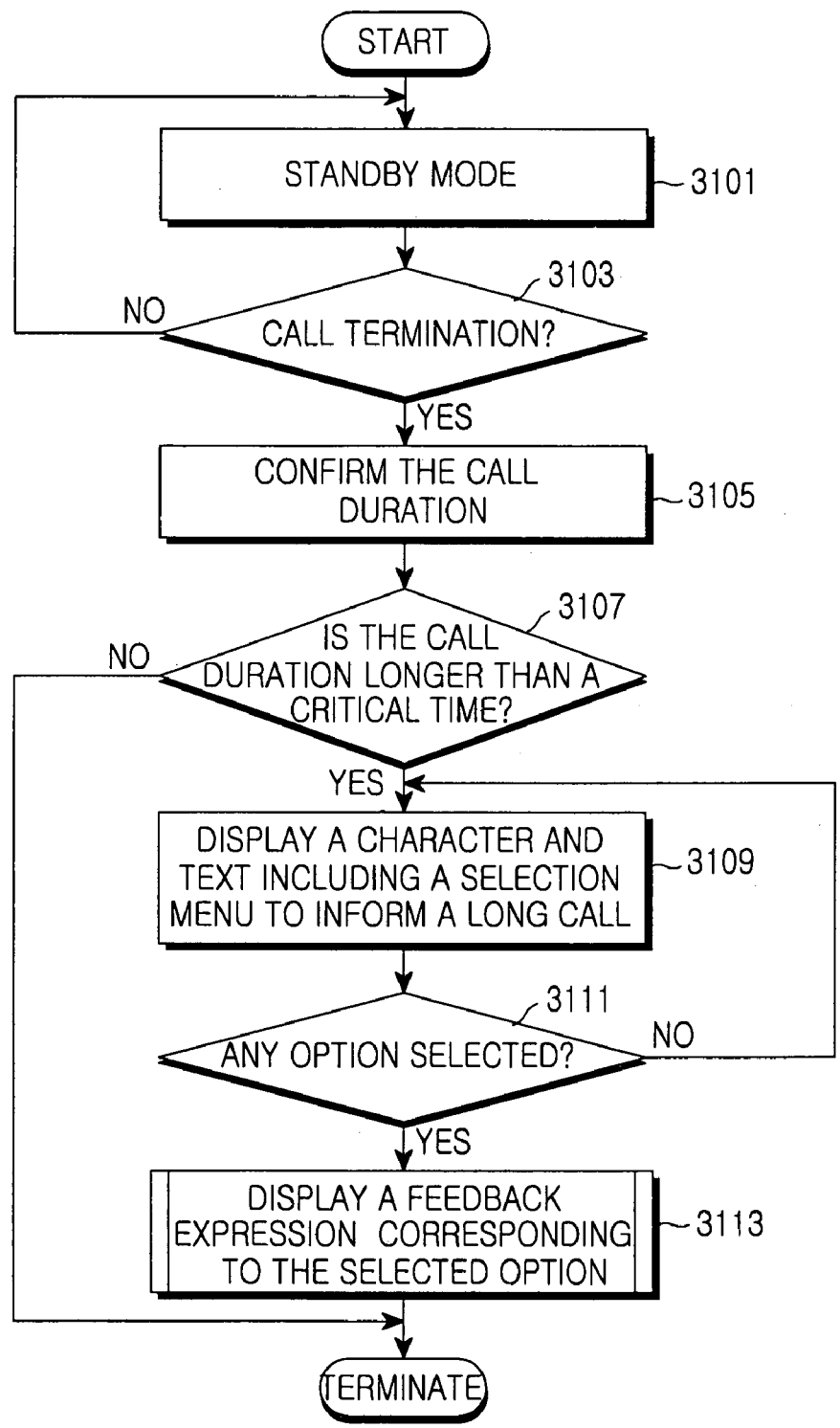
FIG. 8 is a flow chart showing a process for informing the user of a call duration in a mobile terminal according to a preferred exemplary embodiment of the present invention.

FIG. 8 is a flow chart showing a process for informing the user of a call duration and praising the user when a call has lasted a long time on a mobile terminal according to a preferred exemplary embodiment of the present invention. Referring to FIG. 8, when a call termination event occurs in standby mode at step 3101, the control unit 100 confirms the event at step 3103 and proceeds to step 3105. The control unit 100 checks how long the call lasted at step 3105 and determines whether the call duration is longer than a preset critical period of time (for example, 20 minutes) at step 3107. If the call duration is not longer than the critical period of time, the control unit 100 will terminate the process. If the call duration is longer than the critical period of time, the control unit 100 will then proceed to step 3109. At step 3109, the control unit 100 will display a character image and text, including a selection menu as illustrated in FIG. 15(A) to tell the user that the call lasted a long time.

When the user selects one item in the selection menu, the control unit 100 detects the selection at step 3111 and proceeds to step 3113 in order to display a feedback expression corresponding to the user's selection. For example, when the user selects "1. Yes" in the selection menu, the feedback expression can be a happy character image and text corresponding to the selection as illustrated in FIG. 15(B). When the user selects "2. Really?" in the selection menu, the feedback expression can be a happy character image and text corresponding to the selection as illustrated in FIG. 15(C). When the user selects "3. Cut it off!" in the selection menu, the feedback expression can be an angry character image and text corresponding to the selection as illustrated in FIG. 15(D). The displayed character image and text will disappear after a predetermined time period or upon input of a predetermined key.

Figure 9:
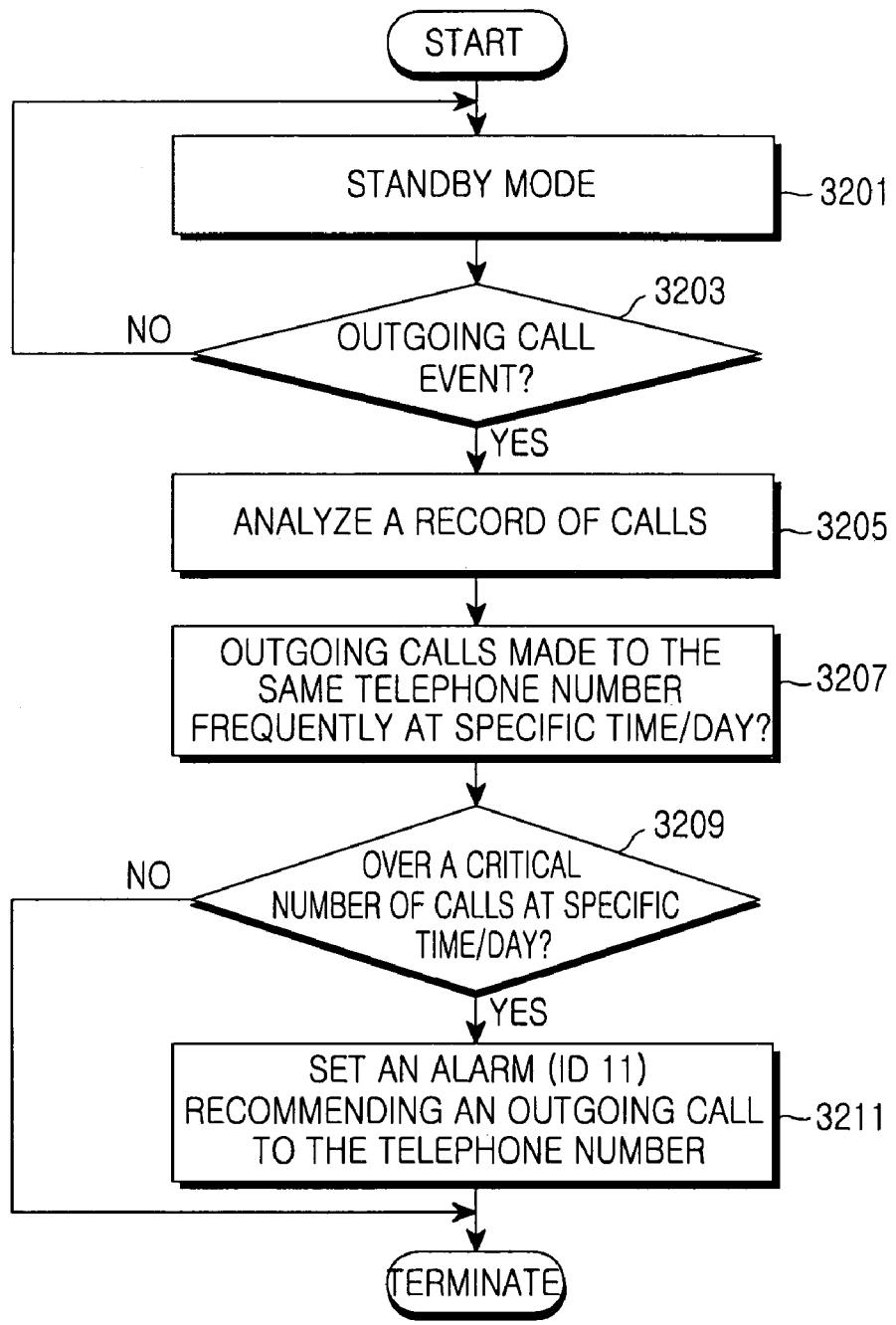
FIG. 9 is a flow chart showing a process for setting an alarm to recommend an outgoing call according to a preferred exemplary embodiment of the present invention.

FIG. 9 is a flow chart showing a process for setting an alarm to recommend an outgoing call according to a preferred exemplary embodiment of the present invention. Specifically, FIG. 9 shows a process for setting an alarm to be generated at a specific time or on a specific day of week in order to recommend that the user make an outgoing call to a person (telephone number) if the user has made outgoing calls to the person frequently at the specific time or on the specific day of week. When an outgoing call event occurs in standby mode at step 3201, the control unit 100 detects the event at step 3203 and analyzes a record of calls at step 3205. The control unit 100 then proceeds to step 3207 to determine whether the user has made outgoing calls to the same person frequently (in excess of a predetermined number within a defined time period or duration) at a specific time or on a specific day of week. For example, if the user made a first call to a telephone number at 10:10 a.m. on Monday in the first week of a month, a second call to the same number at 10:10 a.m. on Monday in the second week, and a third call to the same number at 10:15 a.m. on Monday in the third week, it will be recognized that the user makes an outgoing call to the person regularly (every seven days).

Step 3209 determines whether the user has made outgoing calls to the person at the specific time or on the specific day of week in excess of the critical number. If it is determined that the user has not frequently made outgoing calls to the person at the specific time or on the specific day of week, the control unit 100 will terminate the process. On the other hand, if it is determined that the user has made outgoing calls to the person frequently at the specific time or on the specific day of week, the control unit 100 will proceed to step 3211 in order to set an alarm (ID 11) to be generated at a preset time to recommend that the user to call the person. The preset time can be a time period from a first point of time to the termination of the call (for example, 30 minutes before the termination of the last call to the person), a time period from the termination of the call to a second point of time (for example, 30 minutes after the call termination), or a time period from the first point of time to the second point of time.

Figure 10:
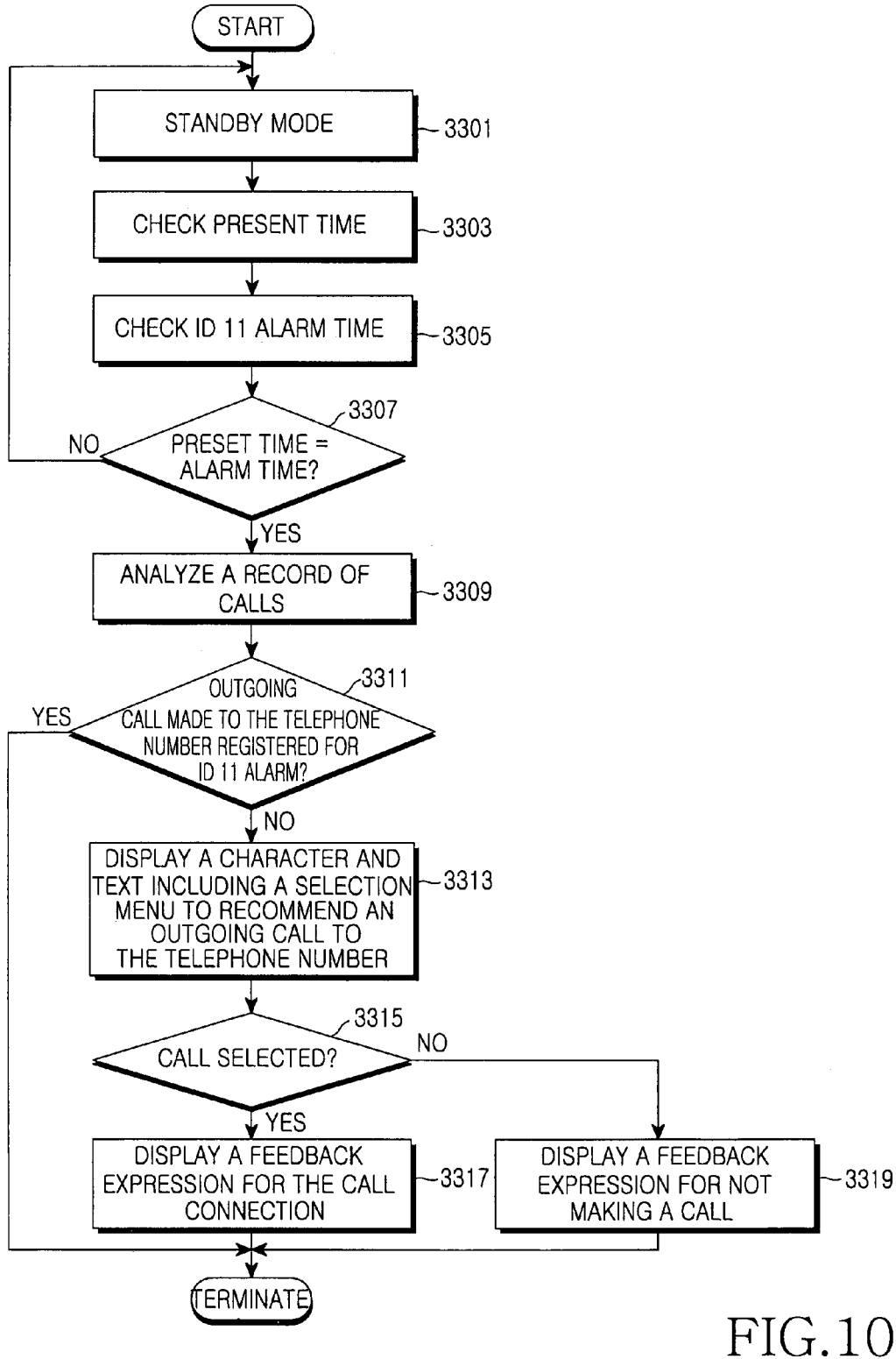
FIG. 10 is a flow chart showing a process for recommending an outgoing call according to a preferred exemplary embodiment of the present invention.

FIG. 10 is a flow chart showing a process for recommending an outgoing call according to a preferred exemplary embodiment of the present invention. Specifically, FIG. 10 show a process for recommending that the user make an outgoing call to a person (telephone number) if the user has made outgoing calls to the person frequently at a specific time or on a specific day of week. In the standby mode of step 3301, the control unit 100 checks the present time at step 3303. Also, at step 3305, the control unit 100 checks a preset time for generating an ID 11 alarm (which has been set to recommend an outgoing call to a telephone number frequently dialed at a specific time or on a specific day of week). If the present time coincides with the preset alarm time, the control unit 100 will detect the coincidence at step 3307 and will proceed to step 3309. At step 3309, the control unit 100 analyzes a record of calls and at step 3311 determines whether the user made an outgoing call to the person (telephone number) registered for the ID 11 alarm event. If the user made an outgoing call, the control unit 100 will terminate the process. Otherwise, the control unit 100 will proceed to step 3313 to display a character image and text including a selection menu as illustrated in FIG. 16(A) during a preset time to recommend an outgoing call to the person. The preset time can be a time period from a first point of time to the termination of the call (for example, 30 minutes before the termination of the last call to the person), a time period from the termination of the call to a second point of time (for example, 30 minutes after the call termination), or a time period from the first point of time to the second point of time.

When the user selects "1. Yes" in the selection menu, the control unit 100 detects the selection at step 3315 and proceeds to step 3317 in order to display a feedback expression for a call connection to the person (telephone number). The feedback expression can be a happy character image and text informing the user of the call connection as illustrated in FIG. 16(B).

When the user selects "2. No" in the selection menu, the control unit 100 detects the selection at step 3315 and proceeds to step 3319 in order to display a feedback expression for not connecting a call to the person. The feedback expression can be a sad character image and text as illustrated in FIG. 16(C). The displayed character image and text will disappear after a predetermined time period or upon input of a predetermined key.

Figure 11:
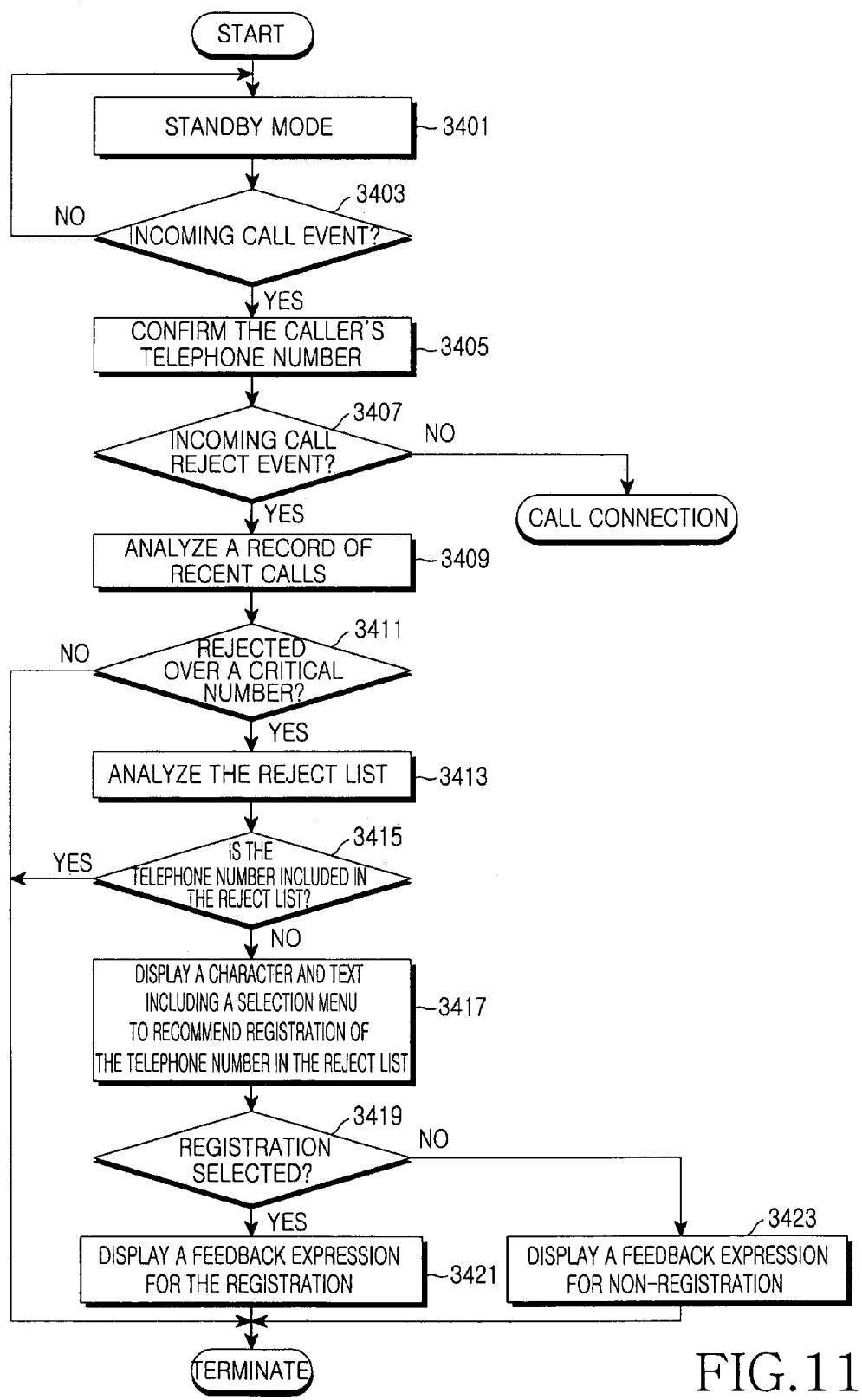
FIG. 11 is a flow chart showing a process for recommending registration of a telephone number in a reject list according to a preferred exemplary embodiment of the present invention.

FIG. 11 is a flow chart showing a process for recommending registration of a telephone number in a reject list according to a preferred exemplary embodiment of the present invention. Specifically, FIG. 11 shows a process for recommending that the user register a telephone number in a reject list if incoming calls from the telephone number have been frequently rejected. When an incoming call event occurs in standby mode at step 3401, the control unit 100 detects the event at step 3403 and confirms the caller (telephone number) at step 3405. When the user rejects another incoming call from the same caller at a later time, the control unit 100 detects the rejection at step 3407 and analyzes a record of recently rejected calls at step 3409. Step 3411 determines whether incoming calls from a caller have been rejected in excess of a critical number. When the analysis results do not show that incoming calls from the same caller have been rejected in excess of a predetermined number of times, the control unit 100 terminates the process. On the other hand, when the incoming calls from the same caller have been rejected in excess of a predetermined number of times, the control unit 100 proceeds to step 3413.

At step 3413, the control unit 100 analyzes the reject list and at step 3415 determines whether the caller's telephone number is registered in the reject list. When the control unit 100 detects that the telephone number is not registered in the reject list, it will proceed to step 3417 in order to display a character image and text including a selection menu as illustrated in FIG. 17(A) to recommend registration of the telephone number in the reject list When the user selects "1. Yes" in the selection menu, the control unit 100 detects the selection at step 3419 and displays a feedback expression for the registration of the telephone number at step 3421. The feedback expression can be a sad character image and text informing the registration of the telephone number in the reject list as illustrated in FIG. 17B).

When the user selects "2. No" in the selection menu, the control unit 100 detects the selection at step 3419 and displays a feedback expression corresponding to the selection at step 3423. The feedback expression can be a happy character image and text as illustrated in FIG. 17(C) to inform that the telephone number is not to be registered in the reject list. The displayed character image and text will disappear after a predetermined time period or upon input of a predetermined key.

Figure 12:
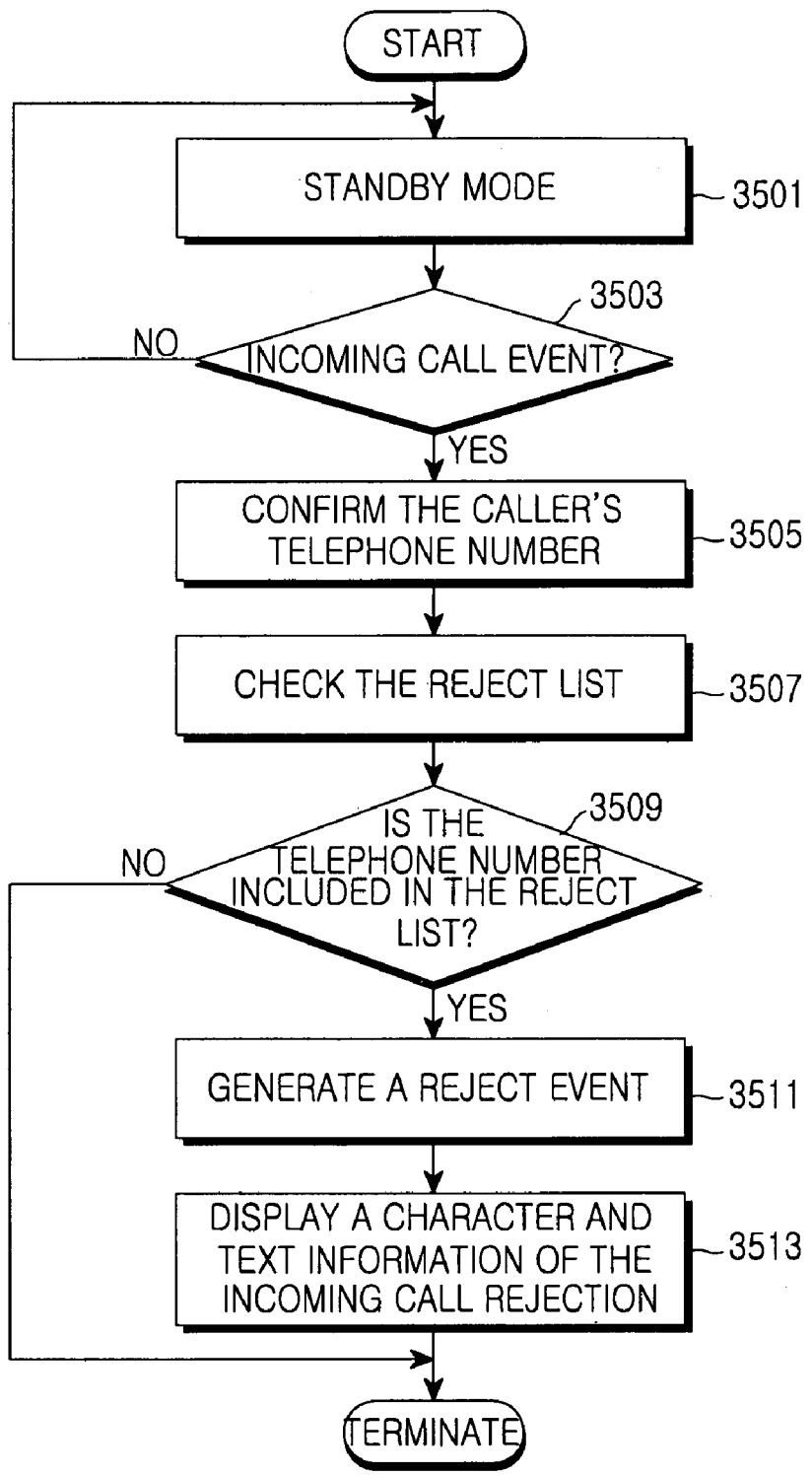
FIG. 12 is a flow chart showing a process for rejecting an incoming call from a telephone number registered in the reject list according to a preferred exemplary embodiment of the present invention.

FIG. 12 is a flow chart showing a process for rejecting an incoming call from a telephone number registered in the reject list according to a preferred exemplary embodiment of the present invention. Referring to FIG. 12, when an incoming call event occurs in standby mode at step 3501, the control unit 100 detects the event at step 3503 and confirms the caller's telephone number at step 3505. The control unit 100 then analyzes the reject list at step 3507 and confirms whether the telephone number is registered in the reject list in step 3509. If the telephone number is registered in the reject list, the control unit 100 will generates an incoming call rejection event at step 3511 and, at the same time, display at step 3513 a UI informing that the incoming call from the telephone number was automatically rejected as illustrated in FIG. 17(D). The UI may comprise a sad character image and text informing the rejection of the incoming call. The displayed character image and text will disappear after a predetermined time period or upon input of a predetermined key.

Figure 13:
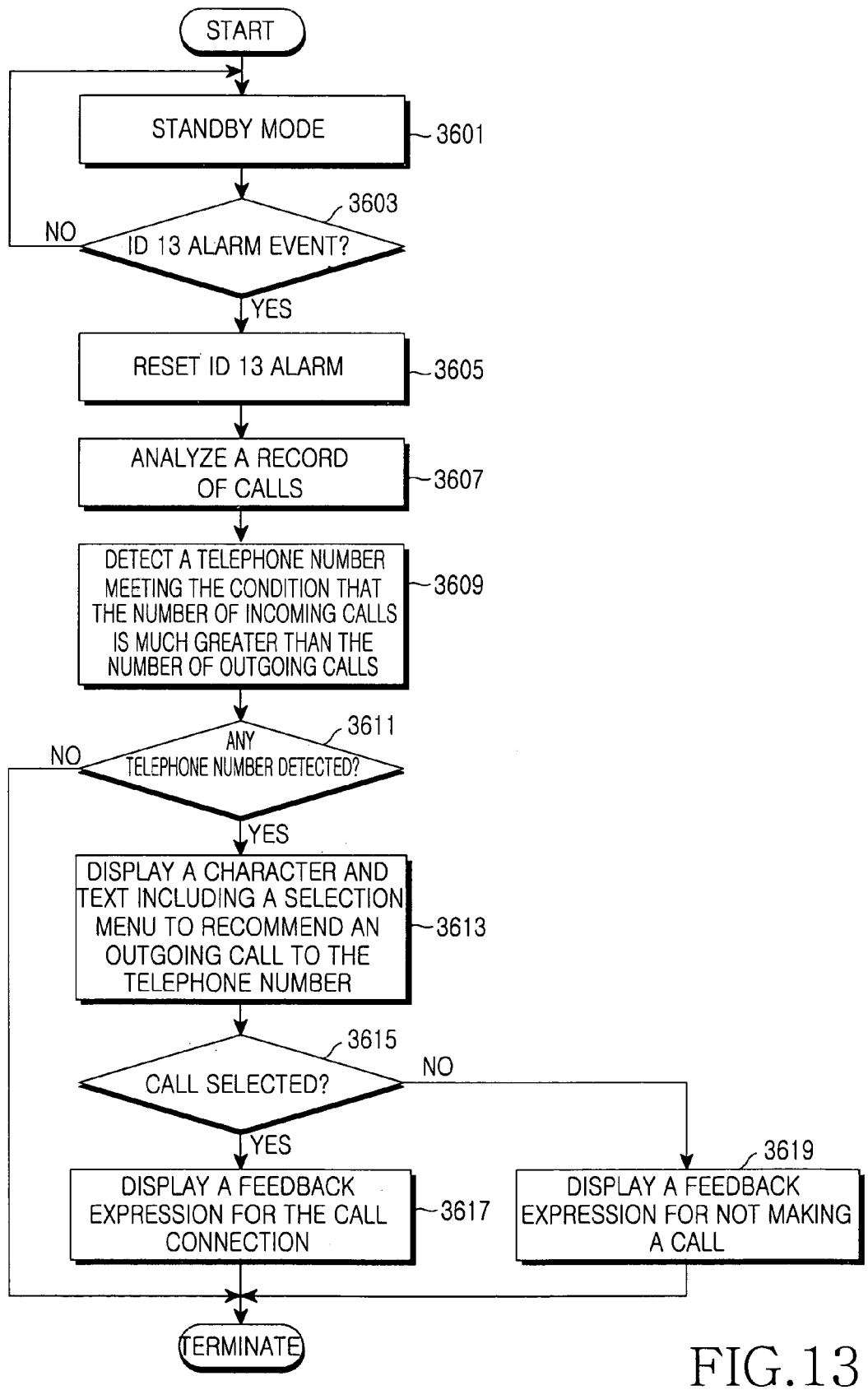
FIG. 13 is a flow chart showing a process for recommending an outgoing call according to a preferred exemplary embodiment of the present invention.

FIG. 13 is a flow chart showing a process for recommending an outgoing call according to a preferred exemplary embodiment of the present invention. Specifically, FIG. 13 shows a process for recommending that the user make an outgoing call to a person if the quantity of incoming calls received from the person is much greater than the quantity of outgoing calls to the same person during a preset period of time. When an ID 13 alarm event (which has been preset to periodically occur to recommend an outgoing call to a person who meets the above condition) occurs in standby mode at step 3601, the control unit 100 detects the event at step 3603 and resets the ID 13 alarm to occur N days layer at step 3605. In other words, the alarm is set to periodically occur every N days. Alternatively, the alarm can be set to occur randomly. The control unit 100 analyzes a record of calls at step 3607 and compares the quantity of incoming calls from each person (telephone number) with the quantity of outgoing calls to each person (telephone number) in order to determine whether the quantity of incoming calls received from a specific telephone number is much greater than the quantity of outgoing calls to the same number at step 3609. In other words, the control unit 100 determines whether the difference between the quantity of incoming calls from a telephone number and the quantity of outgoing calls to the same telephone number is greater than a preset critical value (for example, five). The control unit 100 then detects any person (telephone number) meeting the above condition at step 3611. If no such telephone number is detected, the control unit 100 will terminate the process. If a telephone number meeting the above condition is detected, the control unit 100 will then proceed to step 3613 in order to display a character image and text including a selection menu as illustrated in FIG. 18(A) to recommend an outgoing call to the detected telephone number.

When the user selects "1. Yes" in the selection menu, the control unit 100 detects the selection at step 3615 and displays a feedback expression for a call connection to the detected telephone number at step 3617. The feedback expression can be a happy character image and text informing the call connection to the telephone number as illustrated in FIG. 18(B).

When the user selects "2. No" in the selection menu, the control unit 100 detects the selection at step 3615 and displays a feedback expression corresponding to the selection at step 3619. The feedback expression can be a sad character image and text as illustrated in FIG. 18(C) to inform that an outgoing call to the telephone number will not be made now. The displayed character image and text will disappear after a predetermined time period or upon input of a predetermined key.

Although preferred exemplary embodiments of the present invention have been particularly shown and described for illustrative purposes, those of ordinary skill in the art will appreciate that various modifications, additions and substitutions are possible, without departing from the scope and spirit of the invention as disclosed in the accompanying claims, including the full scope of equivalents thereof.

What is claimed is:

1. A device for processing a call-related event in a mobile terminal, the device comprising:
   a memory for storing character user interface (UT) images corresponding to respective call-related events;
   an event collection part for collecting call-related events occurring in the mobile terminal and generating an event message for identifying each call-related event;
   an agent control part comprising a plurality of specialists having a character UI identification (ID) corresponding with a use case for processing the call-related events, determining at least one of the specialist corresponding to the event message for a call-related event, selecting the character UI identification (ID) possessed by the determined specialist for the call-related event in response to an occurrence of the use case, outputting the selected character UI ID, and processing the call-related event according to feedback information received from a user; and
   an agent expression part for outputting a character image and text corresponding to the character UI ID for the call-related event.

2. The device according to claim 1, further comprising an event delivery part for delivering the call-related events collected by the event collection part to the agent control part.

3. The device according to claim 1, further comprising a supervisor for selecting a specialist most relevant to an event when two or more specialists are selected for the single event.

4. The device according to claim 1, wherein said agent control part includes a specialist for confirming whether the user has made outgoing calls to a specific telephone number over a preset critical number during a predetermined period of time, for confirming whether the telephone number is registered in a phonebook if the user has made outgoing calls to the telephone number over the critical number during the predetermined period of time, and for recommending registration of the telephone number in the phonebook if the telephone number is not currently registered.

5. The device according to claim 4, wherein said agent control part sends a character UI ID possessed by the specialist and information on a owner of the telephone number to the agent expression part and outputs a character image and text recommending registration of the telephone number in the phonebook.

6. The device according to claim 1, wherein said agent control part includes a specialist for praising a long call when a call duration is longer than a preset critical period of time.

7. The device according to claim 6, wherein said agent control part sends a character UI ID possessed by the specialist and information on a call recipient to the agent expression part and outputs a character image and text informing a long duration of call.

8. The device according to claim 1, wherein said agent control part includes a specialist for confirming whether the user has made outgoing calls to a specific telephone number over a predetermined number periodically at a specific time, and for recommending the user to make an outgoing call to the telephone number during a preset time at a next period if the user has made outgoing calls to the telephone number over the predetermined number periodically at the specific time.

9. The device according to claim 8, wherein said agent control part sends a character UI ID possessed by the specialist and information on a owner of the telephone number to the agent expression part and outputs a character image and text recommending the user to make an outgoing call to the telephone number.

10. The device according to claim 1, wherein said agent control part includes a specialist for confirming whether the user has rejected incoming calls from a specific telephone number over a preset critical number during a predetermined period of time, for confirming whether the telephone number is included in a reject list if the incoming calls from the telephone number have been rejected over the critical number during the predetermined period of time, and for recommending the user to register the telephone number in the reject list if the telephone number is not included in the reject list.

11. The device according to claim 10, wherein said agent control part sends a character UI ID possessed by the specialist and information on a owner of the telephone number to the agent expression part and outputs a character image and text recommending registration of the telephone number in the reject list.

12. The device according to claim 1, wherein said agent control part includes a specialist for recommending the user to make an outgoing call to a specific telephone number if the number of incoming calls received from the telephone number is greater than that of outgoing calls to the same telephone number during a preset period of time and if the difference between the numbers is greater than a preset critical value.

13. The device according to claim 12, wherein said agent control part sends a character UI ID possessed by the specialist and information on a owner of the telephone number to the agent expression part and outputs a character image and text recommending an outgoing call to the telephone number.

14. A method for processing a call-related event in the mobile terminal, the method comprises the steps of:
    generating the event message for identifying each call-related event when the outgoing call event occurred in the mobile terminal;
    determining at least one of specialists corresponding to the event message for the call-related event among a plurality of specialists having the character UI identification (ID) corresponding with the use case for processing the call-related events, selecting the character UI identification (ID) possessed by the determined specialist for the call-related event in response to the occurrence of the use case, outputting the selected character UI ID; and
    outputting the character image and text corresponding to the character UI ID for the call-related event.

15. The method according to claim 14, wherein said call-related events comprise a call termination, an incoming call, an outgoing call and an alarm set by a specialist for processing each event.

16. The method according to claim 14, further comprising the steps of: analyzing a record of calls when the outgoing call event occurs;
    confirming whether outgoing calls have been made to the same telephone number over a preset critical number during a predetermined period of time;
    confirming whether the telephone number is registered in a phonebook if outgoing calls have been made to the telephone number over the critical number during the predetermined period of time; and
    displaying a character image and text recommending registration of the telephone number in the phonebook if the telephone number is not currently registered.

17. The method according to claim 16, further comprising the steps of:
    displaying a selection menu together with the character image and text recommending registration of the telephone number in the phonebook;
    displaying a character image and text for setting a contact type when an option for registering the telephone number is selected in the selection menu;
    displaying a character image and text confirming the registration of the telephone number when a contact type is set; and
    displaying a character image and text informing that the telephone number will not be registered, when an option for not registering the telephone number is selected in the selection menu.

18. The method according to claim 16, wherein said character image and text disappear after a predetermined time period or upon input of a predetermined key.

19. The method according to claim 14, further comprising the steps of:
    confirming a call duration when a call termination event occurs;
    determining whether the call duration is longer than a preset critical period of time; and
    displaying a character image and text informing a long call if the call duration is longer than the critical period of time.

20. The method according to claim 19, further comprising the steps of:
    displaying a selection menu together with the character image and text informing a long call; and
    displaying feedback information corresponding to an option selected in the selection menu.

21. The method according to claim 20, wherein said feedback information includes a character image and text.

22. The method according to claim 14, further comprising the steps of:
    analyzing a record of calls when an outgoing call event occurs;
    confirming whether outgoing calls have been made to the same telephone number over a predetermined number periodically at a specific time; and
    setting an alarm to be generated during a preset time at a next period in order to recommend an outgoing call to the telephone number if outgoing calls have been made to the telephone number over the predetermined number periodically at the specific time.

23. The method according to claim 22, wherein said preset time is a time period from a first point of time earlier than the termination of the last call to the telephone number to the termination of the last call, a time period from the termination of the last call to a second point of time later than the call termination, or a time period from the first point of time to the second point of time.

24. The method according to claim 14, further comprising the steps of:
checking the present time and an alarm time set to recommend an outgoing call to a telephone number to which outgoing calls have been made periodically at a specific time;
confirming whether the present time coincidence with the alarm time, analyzing a record of calls and determining whether an outgoing call has been made to the telephone number registered for the alarm; and
displaying a character image and text recommending an outgoing call to the telephone number during a preset time if the outgoing call has not been made.

25. The method according to claim 24, further comprising the steps of:
displaying a selection menu together with the character image and text recommending an outgoing call to the telephone number; and
displaying a character image and text informing a call connection to the telephone number when an option for making a call is selected in the selection menu; and
displaying a character image and text informing that an outgoing call to the telephone number will not be made, when an option for not making a call is selected in the selection menu.

26. The method according to claim 24, wherein said preset time is a time period from a first point of time earlier than the termination of the last call to the telephone number to the termination of the last call, a time period from the termination of the last call to a second point of time later than the call termination, or a time period from the first point of time to the second point of time.

27. The method according to claim 14, further comprising the steps of:
identifying a caller when an incoming call event occurs;
analyzing a record of calls when the incoming call is rejected and confirming whether incoming calls from the same caller have been rejected over a preset critical number during a predetermined period of time; and
confirming whether the caller is included in a reject list if the incoming calls from the same caller have been rejected over the critical number during the predetermined period of time; and
displaying a character image and text recommending registration of the caller in the reject list if the caller is not included in the reject list.

28. The method according to claim 27, further comprising the steps of:
displaying a selection menu together with the character image and text recommending registration of the caller in the reject list;
displaying a character image and text informing registration of the caller in the reject list when an option for registration is selected in the selection menu; and
displaying a character image and text informing that the caller will not be registered in the reject list, when an option for non-registration is selected in the selection menu.

29. The method according to claim 14, further comprising the steps of:
identifying a caller when an incoming call event occurs and confirming whether the caller is registered in a reject list; and
generating an event automatically rejecting the incoming call if the caller is registered in the reject list.

30. The method according to claim 29, further comprising the step of displaying a character image and text informing the rejection of the incoming call, including information on the caller.

31. The method according to claim 14, further comprising the steps of:
detecting when an alarm event occurs to recommend an outgoing call to a telephone number if the number of incoming calls received from the telephone number is greater than the number of outgoing calls to the telephone number during a preset period of time and if the difference between the numbers is greater than a preset critical value;
analyzing a record of calls and comparing the number of incoming calls from each telephone number with the number of outgoing calls to each telephone number in order to detect any telephone number meeting the condition that the number of incoming calls is greater than the number of outgoing calls over the critical value; and
displaying a character image and text recommending an outgoing call to the detected telephone number.

32. The method according to claim 31, further comprising the steps of:
displaying a selection menu together with the character image and text recommending an outgoing call to the detected telephone number; and
displaying a character image and text informing a call connection to the telephone number when an option for making a call is selected in the selection menu; and
displaying a character image and text informing that an outgoing call to the telephone number will not be made, when an option for not making a call is selected in the selection menu.

* * * * *